Oct. 8, 1935.   R. MÜLLER   2,016,611

FILM FEED MECHANISM FOR PHOTOGRAPHIC ROLL FILM CAMERAS

Filed Nov. 7, 1934   2 Sheets-Sheet 1

RUDOLF MÜLLER.

ATTORNEY.

Oct. 8, 1935. R. MÜLLER 2,016,611
FILM FEED MECHANISM FOR PHOTOGRAPHIC ROLL FILM CAMERAS
Filed Nov. 7, 1934 2 Sheets-Sheet 2

INVENTOR.
RUDOLF MÜLLER.
ATTORNEY.

Patented Oct. 8, 1935

2,016,611

UNITED STATES PATENT OFFICE 2,016,611

FILM FEED MECHANISM FOR PHOTOGRAPHIC ROLL FILM CAMERAS

Rudolf Müller, Brunswick, Germany, assignor to Paul Franke and Reinhold Heidecke, both of Brunswick, Germany Application November 7, 1934, Serial No. 751,954
In Germany February 20, 1933

20 Claims. (Cl. 242—71)

The invention relates to film feed mechanism for roll film cameras, intended for use with films of the kind in which a long tab or strip of paper is attached to the leading edge of the film and is used for connecting the film to the take-up spool, for starting the winding.

With such film the first stage of winding consists in winding the paper on the take-up spool. According to my invention the completion of this stage is indicated automatically by detector mechanism actuated by the ridge formed on the strip by the joint between the paper and the film. The invention includes also, in combination with this device, film number indicating mechanism which comes into operation when film is wound on to the take-up spool, after the winding of the paper.

Apparatus embodying the invention is shown in the accompanying drawings, in which Fig. 1 is an elevation showing one embodiment thereof.

Figure 1:
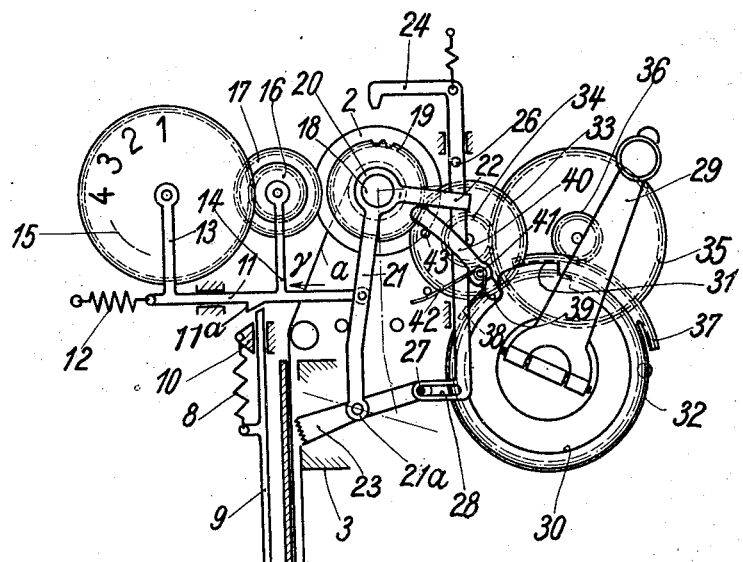

Referring first to the apparatus shown in Fig. 1, 1 designates the delivery spool, and 2 the take-up spool, and $a$ is the paper tab attached to the film $b$. At 25 the paper is joined to the film by a layer of adhesive, forming a ridge. The film strip is fed past a window 3 in the camera, of the size of the picture, the part facing the window being exposed when the shutter is opened. A plate 4, urged by springs in the direction indicated by the arrow $\alpha$, holds the strip against its guides. A nose 5 formed on a double armed lever 6 pivoted at 7 rests on the roll of film on the delivery spool. By placing the roll on the spool the nose 5 is lifted, and the lever 6 is rocked, against the action of a spring 8 attached to a rod 9 pivoted to the lever. The rod is by this means pulled down, as indicated by the arrow $\beta$. The rod slides at the top in a guide 10, above which there is a horizontal slide 11 having a downwardly directed tooth 11ª adapted to be engaged by the top end of the rod. The slide 11 is connected to a spring 12 tending to pull it towards the left. Upon the slide 11 there are two pillars 13, 14. The pillar 13 has at the top a bearing for a counting wheel 15, and the pillar 14 has a bearing for a pinion 16 in mesh with teeth at the rim of the wheel 15. A gear wheel 17 is fixed to the same axle as the pinion 16, and the axle 18 of the take-up spool has fixed thereto a gear wheel 19 adapted to mesh with the gear wheel 17. A bell crank lever 20 having arms 21, 22 is rotatably mounted on the axle 18. The arm 21 of this lever is pivotally connected to the slide 11, and to the free end of this arm, at 21ª, there is pivoted a rocker 23 having a frictional end surface facing the film strip just above the window 3.

The rocker 23 is connected by a stud 27 and slot 28 to the shank of a pawl 24, which is adapted to engage the gear wheel 19 but is normally held out of contact therewith by a spring. A stud 26 on the shank of the pawl is in the path of the lever arm 22.

When a full spool 1 has been placed in the camera the tab $a$ is attached to the spool 2, and the position of the parts is then as shown in the drawings. By the lifting of the nose 5 when the fresh spool is inserted the rod 9 is pulled down, clear of the tooth 11ª, and the spring 12 pulls the slide 11 to the left. The gear wheel 17 is thus held out of engagement with the gear wheel 19, and a spring (not shown) rotates the counter 15 backwards so that the number "1" becomes visible through a window provided for that purpose. The slide 11 rotates the lever 20 so that the friction surface of the rocker 23 is placed very close to the strip.

The spool 2 is then rotated so that the paper tab $a$ is wound thereon, pulling film from the spool 1. When the ridge formed by the joint 25 reaches the member 23 it rocks the same into the position indicated in the drawings by a broken line, and by this means the pawl 24 is pulled downwards and engaged with the toothed wheel 19, so that rotation of the spool 2 is stopped. This occurs when the first section of film for making a picture has been pulled into position facing the window 3. The downward movement of the pawl 24 places the stud 26 close to the lever arm 22.

The lever 20 is then swung into the position indicated by a broken line in the drawings. The mechanism for this purpose will be described hereinafter. By this movement of the lever 20 the pawl 24 is disengaged from the wheel 19 and the slide 11 is moved to the right, so that the pinion 17 engages the wheel 19. Moreover, the rocker 23 is swung so that its free end is lowered again. The reduced diameter of the film roll, due to the tab $a$ and part of the film having been wound off, enables the spring 8 to lift the rod 9 so that it engages the tooth 11ª and locks the slide 11 in the position to which it has been moved. Film can then be wound off the roll for making successive pictures, by turning the spool 2, the counter being actuated by the train of gear 19, 17, 16.

For rotating the spool 2 there is a crank 29 actuatable by hand. This crank rotates a disk 30 having a boss 31 on its rim, and the crank is also connected by pawl and ratchet gear or an equivalent clutch to a toothed wheel 32, so that the crank can rotate this wheel clockwise but is ineffective for rotating it anti-clockwise. The gear wheel 32 meshes with a gear wheel 33 in mesh with the gear wheel 19 fixed to the spool 2. Fixed to the wheel 33 is a pinion 34 meshing with a gear wheel 35 on a shaft having a pinion 36 fixed thereto. This gear wheel 36 meshes with a toothed sector 37 freely rotatable on the shaft of the crank 29. The sector 37 has a hooked extension 38 adapted to engage the boss 31 and operate as a stop limiting the rotation of the crank. By anti-clockwise rotation of the crank the boss is caused to strike the shorter arm 39 of a double armed lever 39, 40 pivoted at 41 and engaged with a spring 42 which normally holds the arm 40 against a fixed abutment 43. The arm 40 is in contact with the lever arm 22. The spring 42 is of sufficient power to render a clearly perceptible effort necessary for rotating the crank anti-clockwise after the boss 31 has struck the lever arm 39.

For rotating the spool 2 each time a fresh section of film is to be moved into position for exposure the crank is rotated clockwise by hand till the boss 31 strikes the extension 38 of the sector 37. It will be noted that the sector is given anti-clockwise rotation by the clockwise rotation of the crank, so that each successive clockwise swing of the crank is shorter than the one before. The length of film wound on the spool 2 by each swing of the crank is thus kept uniform. When the crank is swung back the impact of the boss 31 with the lever arm 39 creates a perceptible check, and normally the movement is then stopped, but when the tab a of a fresh spool has been wound on the spool 2 and the pawl 24 has locked the wheel 19 the pawl can be disengaged by using the crank to press the cam 31 against the lever arm 39 with sufficient force to rotate the lever arms 40 and 22.

Figure 2:
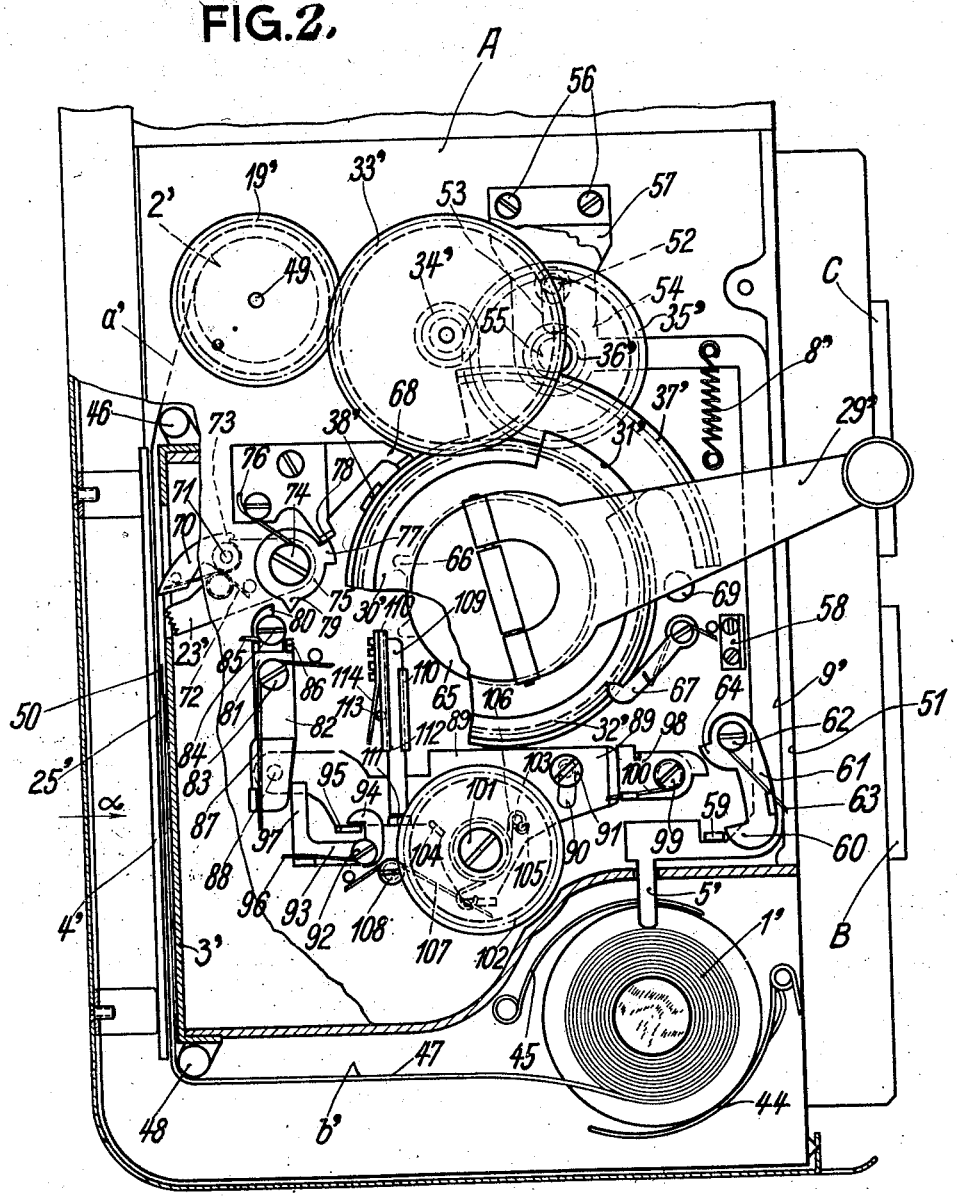
Fig. 2 shows another embodiment of the invention, being an elevation of a camera having two objectives, partly in section and partly broken away to expose the mechanism in the interior thereof.

In Fig. 2 the invention is illustrated in connection with a camera A having in addition to the main objective B a view finder objective C. All the mechanism shown is disposed at one side of the camera casing. At the bottom a film spool 1' is carried by spring loaded holders 44, 45 between which it lies. The film b' has a strip of paper a' attached to its front edge, and the strip and film travel past an opening 3' in the camera casing, through which exposure takes place. The film is guided by rollers 48, 46, and is wound on a spool 2' having an axle 49. At 25' the film and the paper strip a' overlap each other and are joined by means of an adhesive tab 50, so that the joint is comparatively thick. A guide plate 4' is urged by springs towards the opening 3', as indicated by an arrow in the drawings.

A feeler 5' rests on the film on the spool 1', and is integral with a bracket 9', which is slidable between a guide 58 and a part 51 of the camera casing. The bracket has at the top an extension 54 with a slot 53 engaged with a stud 52. To the extensions 54 is fixed, by screws 56, a bearing 57 for a gear wheel 35' and pinion 36'. The bracket 9' is connected to a spring 8', which presses the feeler 5' against the film on the spool 1', the finger passing through a slot in the holder 45. The bracket has a lug 59 adapted to be engaged with the nose 60 of a latch 61 when the bracket is lifted. The latch 61 is pivoted at 62, and a spring 63 urges it towards the lug 59. In addition to the nose 60 the latch has a nose 64, for a purpose to be described hereinafter.

The film feed mechanism is actuated by means of a hand crank 29' connected to a rotatable disc 30' having a nose 31'. The crank is also connected to a disc 65 having a boss 66. In addition the crank is connected by means of a pawl and ratchet or equivalent clutch to a gear wheel 32', so that clockwise rotation of the crank rotates the wheel, whereas anti-clockwise rotation is ineffective for turning the wheel, which is restrained from backward rotation by a pawl 67. The gear wheel 32' is engaged with a gear wheel 33', which is engaged with a gear wheel 19' fixed to the spool 2'. A pinion 34' fixed to the wheel 33 meshes with the gear wheel 35' already referred to and the pinion 36' fixed to this wheel meshes with a toothed sector 37' on a wheel carrying an abutment 38' adapted to coact with the nose 31', so that it acts as a stop limiting the clockwise rocking movement of the disc 30' and the crank 29'. By each clockwise movement of the crank the abutment 31' is moved a step, so that the crank movements are successively shortened, in accordance with the reduced rotation required for winding successive sections of film on the spool 2'. Anti-clockwise rotation of the crank and disc 30' is limited by a fixed stop 68 in the path of the nose 31'.

Figure 3:
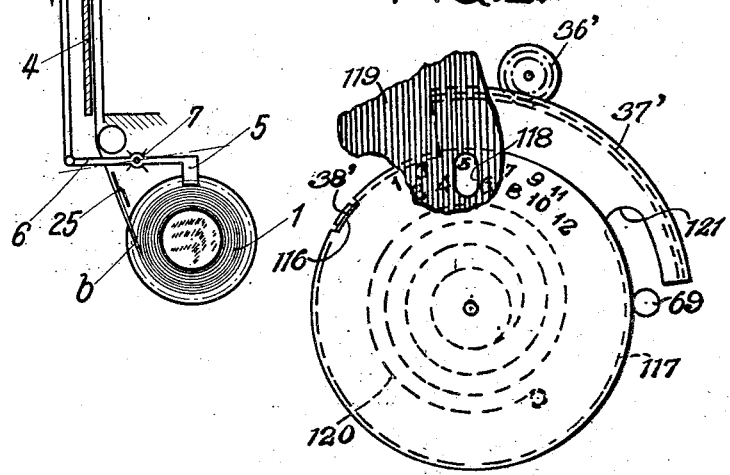
Fig. 3 is an elevation of the film number indicator constituting part of the apparatus of Fig. 2.

As shown in Fig. 3, the hooked extension of the sector 37' engages into a recess 116 in the rim of a dial 117 having thereon a series of numerals representing film numbers. Only a part of this series, namely the range of numerals from 1 to 12, is shown in the drawings. Each film feeding movement of the crank 29', which causes the sector to rotate, imparts also rotation to the dial 117, and this causes the film numbers on the dial to appear in succession behind a window 118 in the side wall 119 of the camera. The rotation of the dial stresses a spiral spring 120, which restores the dial to zero position when the pinion 36' is disengaged from the sector 37'.

Close to the path of the film there is a pawl 70 pivoted at 71 to a finger 23'. A spring 72 tends to hold the pawl in the position in which it is shown in the drawings. In this position a tail 73 of the pawl abuts against the finger 23'. The finger 23' is fixed to a disc 75 rotatable about a stud 74, and a spring 76 tends to hold a nose 77 on the disc in contact with an abutment 78. The disc 75 also has a nose 79 adapted to coact with a pawl 80 carried by a lever 81, 82 pivoted at 83, the pivot of the pawl being shown at 84. A spring 87 acting on the lever 81, 82 urges the same clockwise so that the arm 82 is normally pressed against an abutment not shown in the drawings. Below the arm 82 there is the pivot 88 of a lever 89 having a slot 90 engaged with a stud 91. A pawl 93 pivoted at 92 has a nose 94 adapted to engage a lug 95 on the lever 89. A spring 96 tends to rotate the pawl 93 anti-clockwise, so that a bent tail 97 of the pawl bears against the lever arm 82. The lever 89 carries a pawl 98 pivoted at 99, with a spring 100 normally holding it in the position shown in the drawings, bearing against a lug on the lever 89. This pawl 98 is adapted to engage the nose 64 of the pawl 61 already referred to.

At 101 a toothed wheel 102 is pivoted to the lever 89. There is a stud 103 on this wheel, and in the path of this stud there are two abutments 104 and 105 on the lever. A spring 106 tends to hold the stud 103 in contact with the abutment 105. A spring 107 attached to a stud 108 tends to swing the lever 89 upwards from the position in which it is shown in the drawings, but engagement of the nose 94 with the lug 95 prevents such upward movement. The lever 89 coacts with a bolt 109 working between guides 110 and abutting against a lug 111 on the lever. This bolt has a recess 112 for engagement with a ball 113 pressed against the bolt by a spring 114.

When a fresh spool 1' is placed between the holders 44, 45 the finger 5' and bracket 9' are lifted by the film, and the nose 60, engaging the lug 59, retains the bracket in its lifted position, the pinion 36' being disengaged from the sector 37', so that the film feed mechanism can be actuated without actuating the film number indicator. The paper strip a' is attached to the spool and wound on the same by actuating the crank 29'. When the tab 25' reaches the pawl 70 and actuates the same the finger 23' is rocked and the disc 75 is rotated, so that the nose 79 engages the pawl 80 and rocks the lever 81, 82, causing the nose 94 to be disengaged from the lug 95, so that the lever 89 is rocked by the spring 107, and the toothed wheel 102 engages the wheel 32'.

Rotation of the wheel 102 by rocking the crank 29' causes the stud 103 to be removed from the abutment 105 to the abutment 104, which acts as a stop preventing further movement of the crank. The crank movement by which the wheel 102 is rotated as described is just sufficient to feed the joint between the paper and film past the exposure aperture.

The upward movement of the lever 89 lifts the bolt 109 so that the ball 113 engages the recess 112, and when the crank 29' is swung back, after the feed movement described, the nose 66 strikes the bolt, which depresses the lever 89, restoring the same to its normal position in engagement with the nose 94. The wheel 102 is restored to normal position by the spring 106, and the pawl 98, engaging the nose 64, rocks the catch 63 so that the bracket 9' is released and pulled down by its spring 8', this movement being allowed by the removal of the paper strip from the film spool. The pinion 36' is thus engaged with the toothed sector 37', so that subsequent actuations of the crank 29' causes the film number indicator to be actuated.

When the nose 31' is in contact with the fixed stop 68 the nose 66 is in the position in which it fully depresses the bolt 109.

The construction of the detector mechanism 23', 70 may be modified in various ways. The construction shown has the advantage that the resilient pawl 70 accommodates itself readily to films of different thicknesses. Its length is such that its action is fully reliable with the thinnest film. By thicker film the pawl is more or less depressed, against the action of the spring 72.

What I claim as my invention and desire to secure by Letters Patent of the United States is:—

1. In a roll film photographic camera for use with a film strip having a strip of paper attached to its leading edge by a joint forming a ridge the combination, with mechanism for winding said paper strip and film strip, of means actuatable by said ridge for indicating arrival of the first section of said film strip in position for exposure.

2. In a roll film photographic camera for use with a film strip having a strip of paper attached to its leading edge by a joint forming a ridge the combination, with mechanism for winding said paper strip and film strip, of means actuatable by said ridge for locking said winding mechanism when the first section of said film strip has arrived in position for exposure.

3. In a roll film photographic camera the combination of film winding mechanism, film number indicating mechanism actuated by said winding mechanism, a film delivery spool, and means including a feeler adapted to make contact with film on said spool, whereby said indicating mechanism is put out of operation when said spool is full.

4. In a roll film photographic camera the combination of film winding mechanism, means actuatable by a ridge on the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, and means for unlocking said winding mechanism and restoring said indicating mechanism to operation.

5. In a roll film photographic camera the combination of film winding mechanism, means actuatable by a ridge on the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, manually actuatable means for actuating said winding mechanism, and means for unlocking said winding mechanism and restoring said indicating mechanism to operation, actuated by reversed movement of said manually actuatable means.

6. In a roll film photographic camera the combination of film winding mechanism, means actuatable by a ridge on the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, manually actuatable means including a reciprocatable member for actuating said winding mechanism, the movement of said reciprocatable member in one direction being idle, and means for unlocking said winding mechanism and restoring said indicating mechanism to operation, actuatable by extending the idle movement of said reciprocatable member.

7. The combination claimed in claim 6, said means for unlocking said winding mechanism and restoring said indicating mechanism to operation including a spring loaded member in the idle path of said reciprocatable member.

8. In a roll film photographic camera the combination of film winding mechanism, means actuatable by a ridge on the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, means including a crank for actuating said winding mechanism, the movement of said crank in one direction being ineffective for winding, an abutment rocked by rocking said crank, a stop in the path of said abutment, means whereby said crank adjusts said stop so that the driving movements of said crank are successively shortened, and means actuatable by said abutment, by extending the idle movement of said crank, for unlocking said winding mechanism and restoring said indicating mechanism to operation.

9. In a roll film photographic camera the combination of film winding mechanism, means actuatable by a ridge on the the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, means including a crank for actuating said winding mechanism, the movement of said crank in one direction being ineffective for winding, an abutment rocked by rocking said crank, a stop in the path of said abutment, means whereby said crank adjusts said stop so that the driving movements of said crank are successively shortened, and means actuatable by said abutment, by extending the idle movement of said crank, for unlocking said winding mechanism and restoring said indicating mechanism to operation, said last mentioned means including a double armed, spring loaded lever having one arm in the path of said abutment.

10. In a roll film photographic camera the combination of film winding mechanism, means actuatable by a ridge on the the film strip for locking said winding mechanism when the first sensitized section of the film strip has been moved into position for exposure, film number indicating mechanism actuatable by said winding mechanism, a removable delivery spool, means for putting said indicating mechanism out of operation, actuated by insertion into the camera of said spool with a roll of film thereon, means including a crank for actuating said winding mechanism, the movement of said crank in one direction being ineffective for winding, an abutment rocked by rocking said crank, a stop in the path of said abutment, means whereby said crank adjusts said stop so that the driving movements of said crank are successively shortened, and means actuatable by said abutment, by extending the idle movement of said crank, for unlocking said winding mechanism and restoring said indicating mechanism to operation, said last mentioned means including a double armed spring loaded lever having arms of different lengths, the shorter arm being in the path of said abutment, and a member actuatable by the longer arm of said lever.

11. In a roll film photographic camera the combination, with film-feed mechanism of a detector adapted to be actuated by a ridge on the film strip, located in the path of the film facing the exposure aperture, a preparatory coupling device actuated by said detector prior to arrival of a film section in front of said aperture, and stop mechanism actuated by said coupling, to become effective when said section of film has completed its travel into position facing the aperture.

12. Film-feed mechanism as claimed in claim 11, wherein the detector releases a source of energy which effects engagement of a gear allowing only a limited movement of the film feed mechanism.

13. In a roll film photographic camera the combination, with film feed mechanism including a toothed driving wheel, of a detector actuatable by a ridge on the film strip, located in the path of the film facing the exposure aperture, a spring loaded carrier, a gear wheel mounted on said carrier, adapted to be engaged with said driving wheel by movement of said carrier under the action of its spring, a stop limiting the rotation of the gear wheel on said carrier, a locking device whereby said carrier is restrained from moving the gear wheel thereon into engagement with said driving wheel, and means whereby said detector unlocks said locking device and releases said carrier when actuated by the ridge on the film strip.

14. In a roll film photographic camera the combination, with film feed mechanism including a toothed driving wheel, of a detector actuatable by a ridge on the film strip, located in the path of the film facing the exposure aperture, a spring loaded carrier, a gear wheel mounted on said carrier, adapted to be engaged with said driving wheel by movement of said carrier under the action of its spring, an abutment on the gear wheel mounted on said carrier, two stops on said carrier, in the path of said abutment, limiting the rotation of said gear wheel on said carrier, a spring engaging said gear wheel whereby said abutment is normally held against one of said stops, a locking device whereby said carrier is restrained from moving the gear wheel thereon into engagement with said driving wheel, and means whereby said detector unlocks said locking device and releases said carrier when actuated by the ridge on the film strip.

15. In a roll film photographic camera the combination, with film feed mechanism including a toothed driving wheel, of a detector actuatable by a ridge on the film strip, located in the path of the film facing the exposure aperture, a spring loaded carrier, a gear wheel mounted on said carrier, adapted to be engaged with said driving wheel by movement of said carrier under the action of its spring, a stop limiting the rotation of the gear wheel on said carrier, a locking device restraining said carrier from being moved by its spring, means whereby said detector unlocks said locking device and releases said carrier when actuated by the ridge on the film strip, mechanism for actuating a film number indicator, means for coupling said last mentioned mechanism with said feed mechanism, a device for returning said carrier to its locked position, and means whereby said carrier by its return movement to locked position puts said coupling means into operation.

16. In a roll film photographic camera the combination, with film feed mechanism including a toothed driving wheel, of a detector actuatable by a ridge on the film strip, located in the path of the film facing the exposure aperture, a spring loaded carrier, a gear wheel mounted on said carrier, adapted to be engaged with said driving wheel by movement of said carrier under the action of its spring, a stop limiting the rotation of the gear wheel on said carrier, a locking device restraining said carrier from being moved by its spring, means whereby said detector unlocks said locking device and releases said carrier when actuated by the ridge on the film strip, mechanism for actuating a film number indicator, a spring loaded coupling device for coupling said last mentioned mechanism with said feed mechanism, a catch restraining said coupling device from operation, a device for returning said carrier to its locked position, and means whereby said carrier by its return movement to locked position disengages said catch from said coupling device.

17. The combination claimed in claim 16, together with a holder for a film spool and a feeler adjacent said holder, connected to said coupling device, so that insertion of a full spool into said holder causes movement of said feeler putting said coupling device out of operation.

18. In a roll film photographic camera the combination, with film feed mechanism including a toothed driving wheel, of a manually actuatable rock arm which actuates said feed mechanism by movement in one direction, a detector actuatable by a ridge on the film strip, located in the path of the film facing the exposure aperture, a spring loaded carrier, a gear wheel mounted on said carrier, adapted to be engaged with said driving wheel by movement of said carrier under the action of its spring, a stop limiting the rotation of the gear wheel on said carrier, a locking device restraining said carrier from being moved by its spring, means whereby said detector unlocks said locking device and releases said carrier when actuated by the ridge on the film strip, mechanism for actuating a film number indicator, means for coupling said last mentioned mechanism with said feed mechanism, a device for returning said carrier to its locked position, and means whereby said carrier by its return movement to locked position puts said coupling means into operation, a spring loaded coupling device for coupling said last mentioned mechanism with said feed mechanism, a catch restraining said coupling device from operation, a device for returning said carrier to its locked position, actuatable by movement of said rock arm in the non-feed direction, and means whereby said carrier by its return movement to locked position disengages said catch from said coupling device.

19. The combination claimed in claim 18, said device for returning said carrier to its locked position including a wheel rotated by said rock arm, a nose on said wheel, and a slidable bolt abutting against said carrier and moved into the path of said nose by said carrier when said carrier is moved by its spring.

20. The combination claimed in claim 11, said detector comprising a pivoted finger, a pawl pivoted thereto and projecting into the path of the ridge on the film strip, whereby said finger is rocked when said ridge strikes said pawl, and a disk rotated by said finger for actuating said preparatory coupling device.

RUDOLF MÜLLER.